United States Patent [19]
Chiang

[11] Patent Number: 6,072,255
[45] Date of Patent: Jun. 6, 2000

[54] SUBMERSIBLE MOTOR FOR AQUARIUM

[76] Inventor: Han-Chin Chiang, 4F, No. 238, Fu-Kang Street, Taipei, Taiwan

[21] Appl. No.: 09/360,451

[22] Filed: Jul. 26, 1999

[51] Int. Cl.[7] .............................. H02K 5/12; F04B 17/00
[52] U.S. Cl. .......................... 310/87; 310/67 R; 417/424
[58] Field of Search ............................ 310/87, 89, 67 R; 417/279, 283–286, 312, 324, 338; 410/355, 424, 434, 436, 410, 423.1

[56] References Cited

U.S. PATENT DOCUMENTS

| | | | |
|---|---|---|---|
| 4,043,914 | 8/1977 | Horvath | 210/169 |
| 4,053,262 | 10/1977 | Horvath | 417/423.14 |
| 4,786,240 | 11/1988 | Koroly et al. | 417/413.1 |
| 5,052,904 | 10/1991 | Itakura et al. | 417/363 |
| 5,137,432 | 8/1992 | Tsai | 417/312 |
| 5,137,433 | 8/1992 | Willinger et al. | 417/312 |
| 5,266,190 | 11/1993 | Tominaga | 210/169 |
| 5,290,157 | 3/1994 | Willinger et al. | 417/423.15 |
| 5,711,656 | 1/1998 | Tsai | 417/312 |
| 5,877,566 | 3/1999 | Chen | 310/87 |

*Primary Examiner*—Nestor Ramirez
*Assistant Examiner*—Trann Nguyen
*Attorney, Agent, or Firm*—Bacon & Thomas

[57] ABSTRACT

An improvement made in components of submersible motor for aquarium is provided for improving oxygen content of output water from a submersible motor and for assembling components in a relatively easier way. For realizing above-said functions, an air inlet of an water-guiding chamber of this invention is disposed near a trail end of a blade, so that the air sucked is stirred by a plurality of end edges of the blade and dissolved in the water, and moreover, a protruded ferrule is provided to a magnetic pivot for fixedly snapping to combine with the blade for convenient assembling. Besides, a control valve is also provided for stepless flow rate adjustment in order to control water volume entering the water-guiding chamber, and the conventional measure for combining a cover with the water-guiding chamber is revised by employing an inserting tongue piece and a snapping barb instead to promote application efficacy and assembling convenience.

6 Claims, 7 Drawing Sheets

SUBMERSIBLE MOTOR FOR AQUARIUM

BACKGROUND IF THE INVENTION

This invention relates to an improved submersible motor for aquarium, more particularly, to a submersible motor, wherein water flow can be circulated and filtered for raising oxygen content.

Generally, a submersible motor is disposed on an inner wall in water for providing circulation of water flow and increment of oxygen content, and further, it may combine with a filter sponge for water filtration. The integrally designed submersible motor requires some additional components, such as blades, water-guiding chamber, water inlet, air inlet, water outlet, filter sponge, etc in addition to indispensable parts in an average motor. In abovesaid items, the blades are fixedly jointed to a magnetic pivot end and located in the water-guiding chamber, the water inlet is disposed in an axial position relative to the blades, the water outlet is arranged locating in a radial position relative to the blades, and the air inlet is located at root portion of the blades. In virtue of such a construction, the motor will drive the blades to suck water and air into the water-guiding chamber, so that the blades will stir and mix the air and the water entered in order to raise the oxygen content, and the sucked water may flow through a filter sponge for filtering to keep its quality. The integrally designed conventional submersible motor may be small in volume, however, there are some defects found in this construction as the following:

1. The air inlet located at root portion of the blades cannot mix the sucked air with the water sufficiently that results in a poor efficacy for raising the oxygen content.

2. The process for combining the magnetic pivot and the blades is not easy, and the construction is relatively complicated.

3. The sealing tightness of a cover plate is poor and is liable to get loosened, which are pending improvements.

4. The flow rate of input water through the water inlet is mostly unadjustable, so that it cannot be controlled for a proper water flow.

5. The transferability of the components is poor due to the mono-functional design of the construction that the components cannot be substituted.

SUMMARY OF THE INVENTION

In view of above defects with regards to a conventional submersible motor, this invention is proposed to provide an improved structure of the subject matter for eliminating abovesaid imperfections.

The primary object of this invention is to arrange an air inlet at a position near a trail end of a blade in a water-guiding chamber, so that the blade will stir to mix the sucked air with water for raising oxygen content. Besides, a protruded ferrule is adopted that realize an easy fixedly fastening manner for combining a magnetic pivot to the blade, and moreover, with a stepless water volume adjusting device and a design of optional multi-combinations for functional purposes, the system can be transferred with convenience.

In addition, the position with the largest negative pressure located near center of a water inlet in the water-guiding chamber communicable with atmosphere is advantageous for sucking air. And also, a partition piece disposed at inner side of a tubular water outlet in the water-guiding chamber is helpful in eliminating any turbulent or volute flow, so as to guide water flow to pass through the water outlet smoothly and thereby an enhanced flow volume is obtainable.

BRIEF DESCRIPTION OF THE DRAWINGS

For a better understanding to the present invention, together with further advantages or features thereof, at least one preferred embodiment will be elucidated below with reference to the annexed drawings in which.

DETAILED DESCRIPTION OF THE PREFERRED EMBODIMENT

Figure 1:
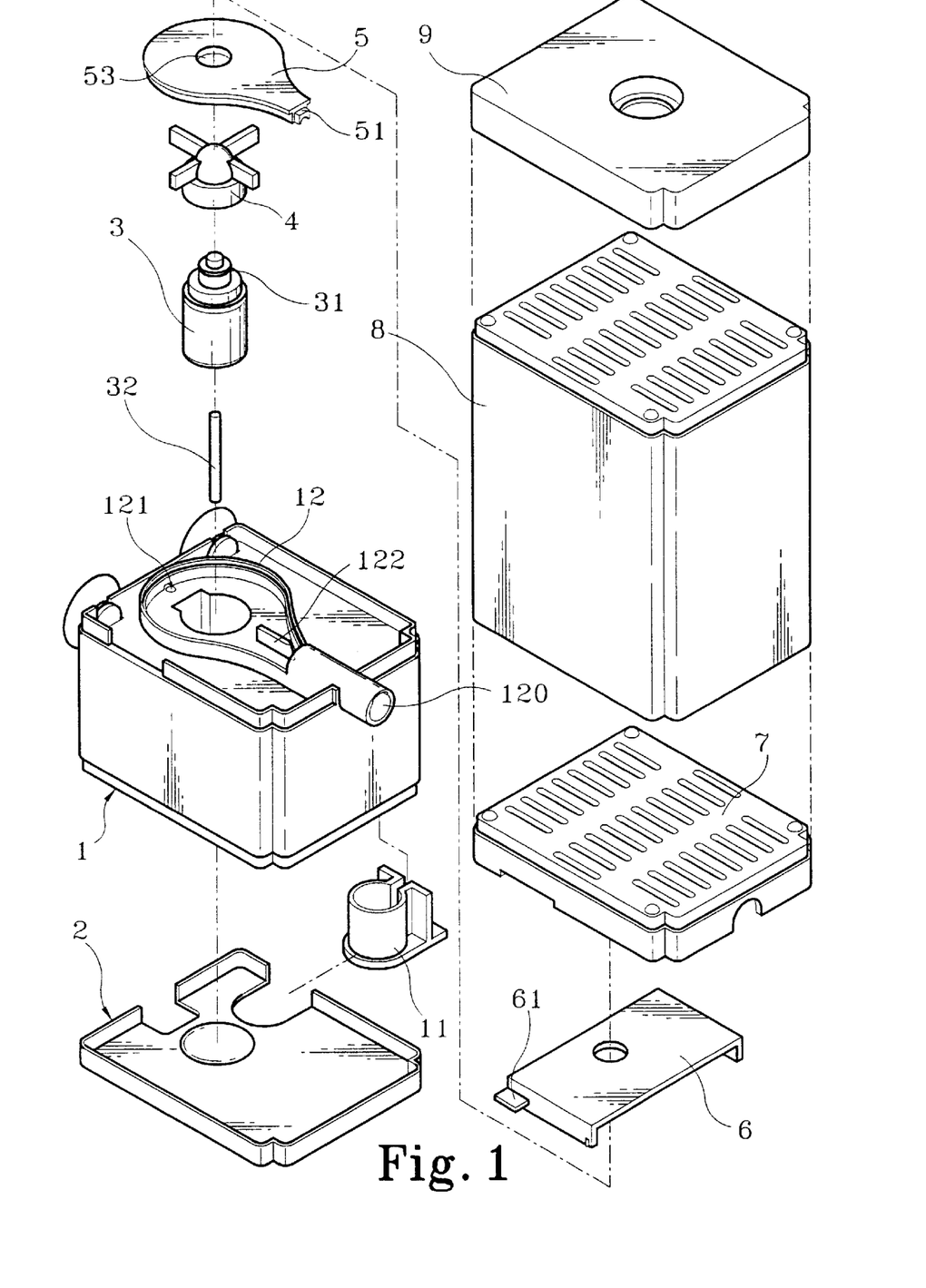
FIG. 1 is an exploded three-dimensional view of this invention.
Figure 2:
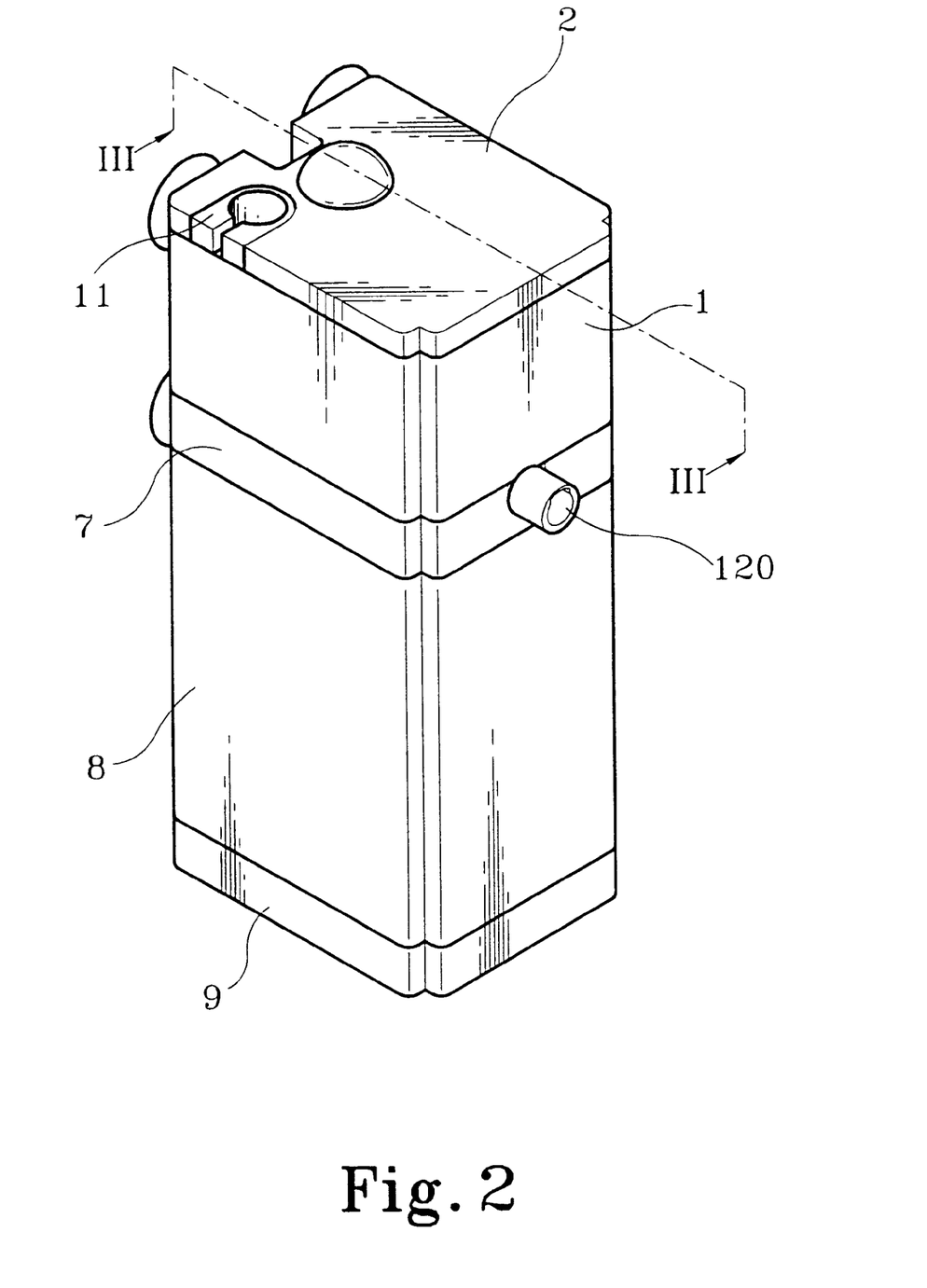
FIG. 2 is a schematic three-dimensional view of this invention.

As shown in FIG. 1, this invention mainly comprises a motor container 1, a container cover 2, a magnetic pivot 3, a blade 4, a cover 5 of water-guiding chamber 12, a water flow adjustable control valve 6, a base 7, a filter tank 8, and a coupling of water pumping duct 9. In the abovesaid components, the motor container 1 contains general components of an average motor (that requires no more repeated statement), and a cord harness 11 is inserted in an edge of inner wall of the motor container 1 for securely binding the wires before using the container cover 2 to cover the motor container 1 and sealing with an epoxy resin to isolate the components in the motor container 1. Another end of the motor container 1 is provided with a water-guiding chamber 12 having a tapered water outlet 120 and the magnetic pivot 3 which is inserted in center part of the water-guiding chamber 12 and is driven to rotate by induction of the motor components sealed in the motor container 1. The upper end of the magnetic pivot 3 is coupled with the blade 4, and for easy combination, the magnetic pivot 3 of this invention is provided with a protruded ferrule 31 corresponding to a receptacle in the blade 4, wherein the center head of the blade 4 is made in arc shape that seals the upper end of the magnetic pivot 3, which is provided with a pin pivot 32 at its center that is plugged in the magnetic pivot 3 by one end and in the motor container 1 by the other respectively. An air inlet 121 is arranged in the water-guiding chamber 12 at a position near trail end of the blade 4 to penetrate the water-guiding chamber 12 and couple with a rubber hose for guiding air into the water-guiding chamber 12. A partition piece 122 at a position corresponding to the air inlet 121 is arranged to inner side of the water outlet 120 for providing a smooth channel for the flowing-out water. The cover 5 utilized to seal the water-guiding chamber 12 is offered at one end with a tongue piece 51 for inserting the cover 5 in inner wall of the tubular water outlet 120, and the other end of the cover 5 is provided with a barb 52 (not shown) for fixedly hooking at edge of the water-guiding chamber 12 in order to obtain an efficacy than the used packing manner. The cover 5 having a water inlet 53 disposed in a position corresponding to center of the blade 4, wherein the water inlet 53 is controlled by the control valve 6 to open or close or to adjust its magnitude for a stepless control of the water flow. The cutaway section of the control valve 6 is substantially made in U shape striding the water-guiding chamber 12, and is flatly attached on the cover 5, wherein a side ear 61 is available in the control valve 6 facilitating push of the control valve 6 for adjusting the water inlet 53 to change the water flow. Also, a flange is formed laterally to the control valve 6 to lean intimately against edge of the motor container 1, so that when it is pushed to a designated position, it can be kept there due to a frictional force produced by the push force. Moreover, the base 7 arranged at outside of the control valve 6 is fixedly fastened to the motor container 1, wherein a plurality of slots is formed in the base 7 allowing water flow to enter the water-guiding chamber 12, and the filter tank 8 or the coupling of water pumping duct 9 can be alternatively selected to be fixedly fastened to the base 7. The filter tank 8 having a filter sponge 81 (not shown in FIG. 1) is employed for filtering the water pumped into the water-guiding chamber 12, while the coupling of water pumping duct 9 having a through hole accommodating a water pumping duct to get combinably plugged for pumping the water in bottom layer of an aquarium. The entire assembled body is shown in FIG. 2.

Figure 3:
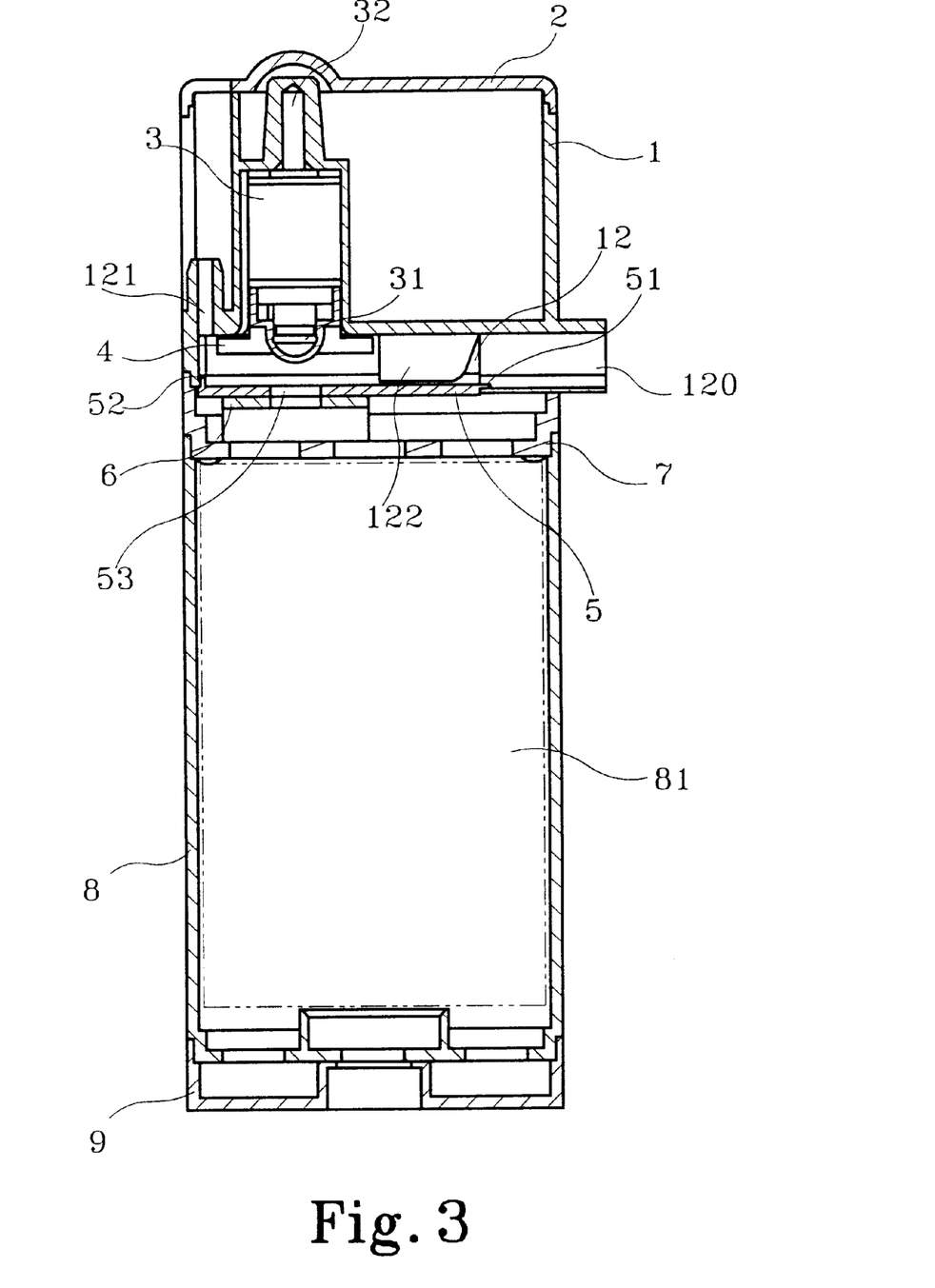
FIG. 3 is a cutaway sectional view of this invention along line III—III in FIG. 2.
Figure 4:
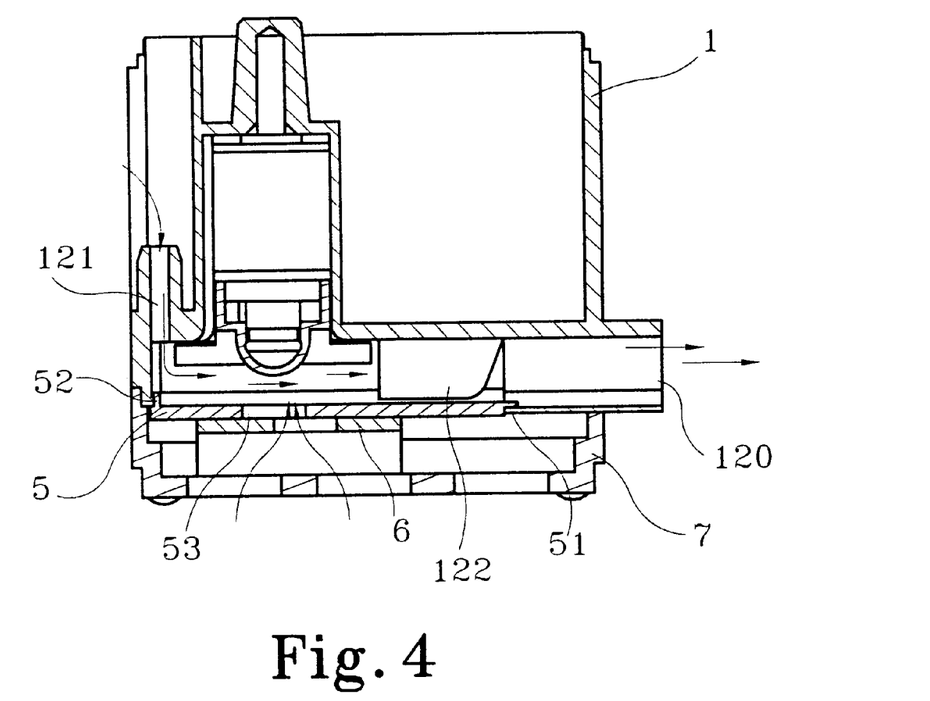
FIG. 4 is an action diagram showing water flow adjustment of this invention.
Figure 5:
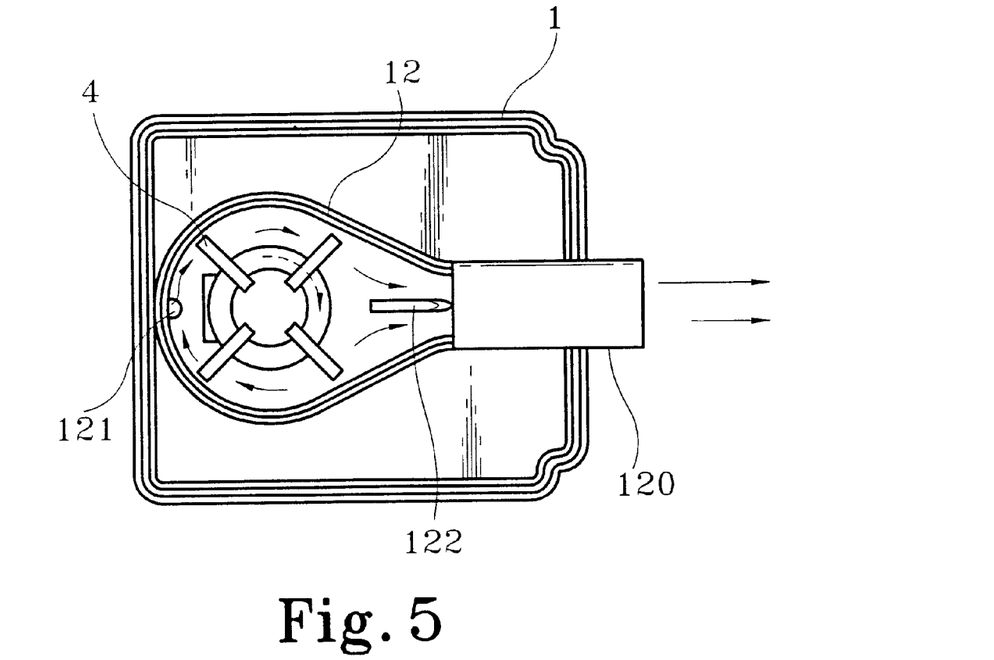
FIG. 5 is an end view of water-guiding chamber of this invention showing mix of air and water flow.

Referring FIGS. 3, 4, and 5, the combination of the magnetic pivot 3, the water-guiding chamber 12 and the blade 4 can suck water and air through the water inlet 53 and the air inlet 121 respectively for mixing, then sends the mixture to the water outlet 120 for output. The water flow enters an entrance at bottom end, then passes through the filter sponge 81, the base 7, and the control valve 6 to arrive at the water inlet 53. The cover 5 is combined with the water-guiding chamber 12 in virtue of the tongue piece 51 and the barb 52, and the control valve 6 is disposed at an outer side thereof. The control valve 6 can be pushed to move and change the magnitude of the water inlet 53 (as shown in FIG. 4). The water flow passed the water inlet 53 then enters the water-guiding chamber 12 in axial direction of the blade 4 to perform a circular movement in the water-guiding chamber 12 following rotation of the blade 4. The air entered through the air inlet 121 is stirred by the trail end of the blade 4 to be dispersed and dissolved in the water flow, then is propelled by the blade 4 to flow along the water-guiding chamber 12 and out of the water outlet 120 for obtaining a water flow with a relatively higher oxygen content.

Further, as the partition piece 122 is located at the tubular water outlet 120 in the water-guiding chamber 12, thus, when the water flow and the bubbles, which are created at the air inlet 121, propelled by the blade 4 arrive at the partition piece 122, the partition piece 122 will guide and ensure the mixture of air and water to flow smoothly out of the tubular water outlet 120 with an increased volume, and release the oxygen contented bubbles under a lowered load.

Figure 6:
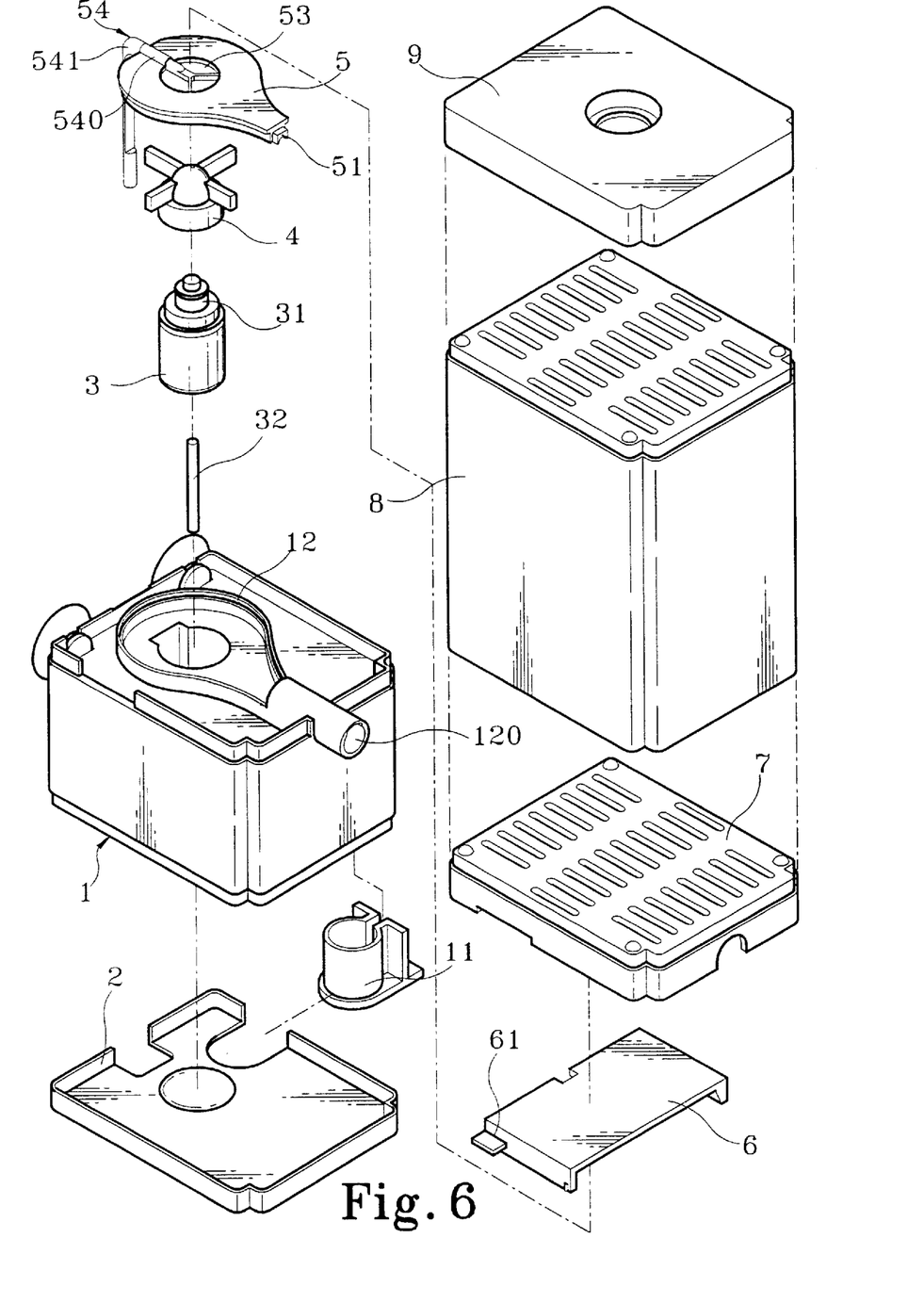
FIG. 6 is a schematic view of another embodiment of this invention.

As shown in FIG. 6, this invention may arrange an air intake manifold 54 on the cover 5 of the water-guiding chamber 12 near center point of the water inlet 53, which, in its cutaway section, forms substantially a right angle to extend until backside of the motor container 1, wherein the air intake manifold 54 comprises a front air duct 540 fixedly disposed on the cover 5 of the water-guiding chamber 12 and a rear air duct 541 coupled with the front air duct 540 in the same axis, wherein the trail end of the rear air duct 541 is coupled with an average flue pipe.

Therefore, the open end of the front duct 540 is located near center point of the water inlet 53, and according to principle of a centrifugal pumping motor, it is known that the center point is where the negative pressure is the largest, so that massive air can be sucked by the air intake manifold 54 of this invention and stirred by the blade 4 for being sufficiently dissolved in the water to thereby raise the oxygen dissolubility for providing better cultivation conditions.

Figure 7:
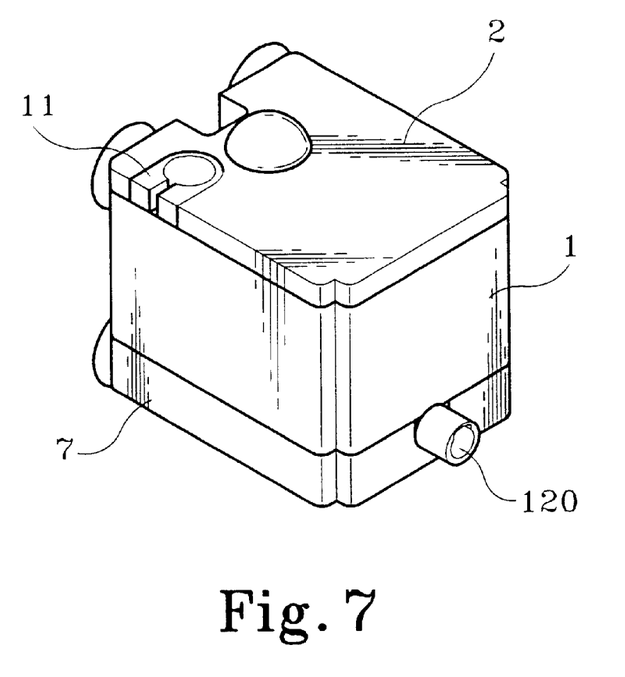
FIGS. 7 through 9 are schematic diagrams showing various combinations and embodiments of this invention.
Figure 8:
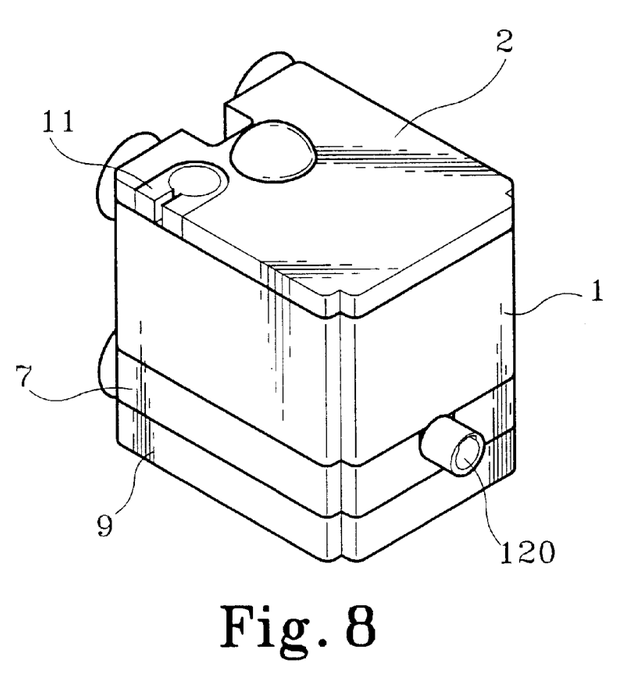
Figure 9:
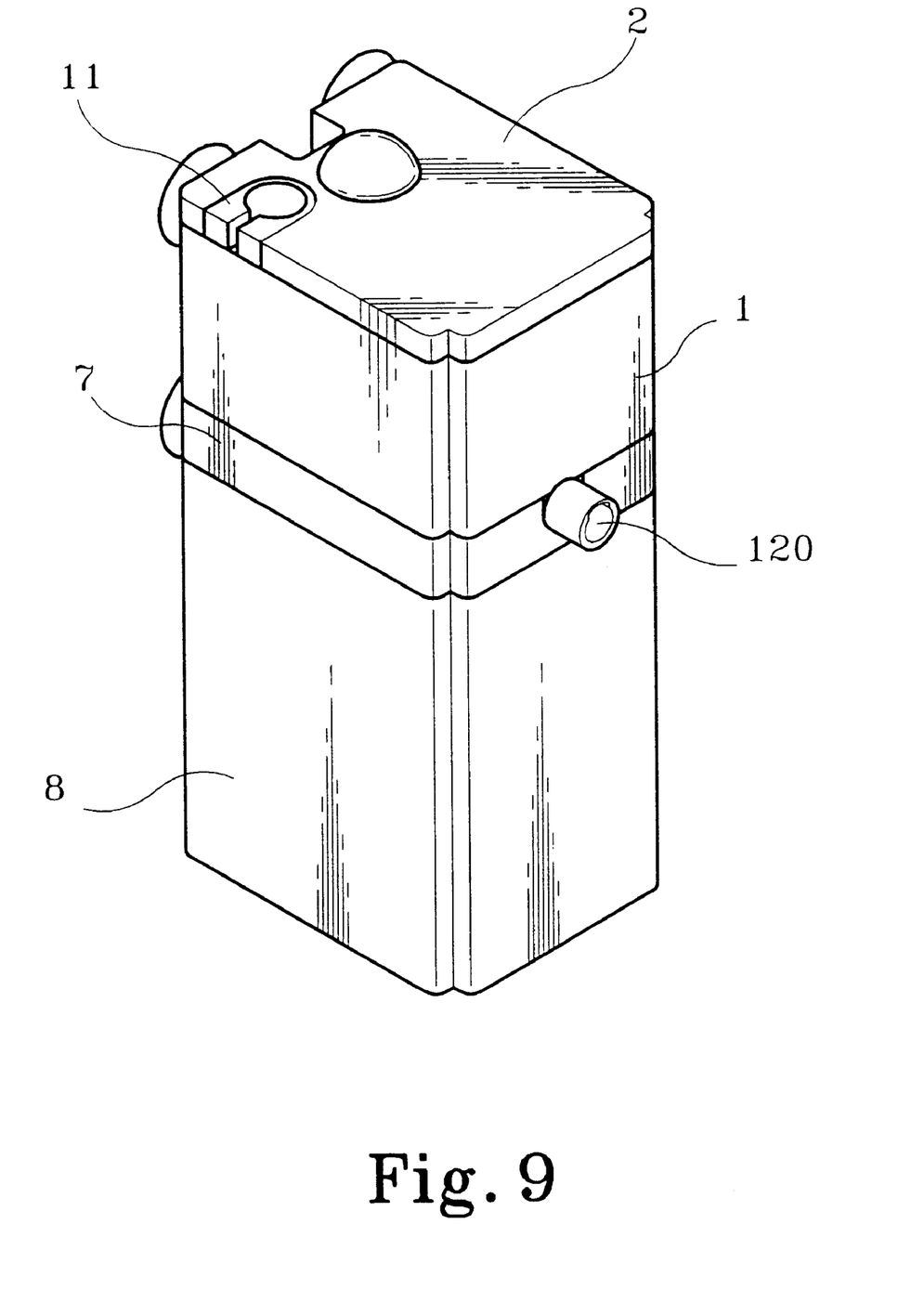

FIG. 7 indicates that the base 7, the filter tank 8, and the coupling 9 are designed in an optional manner for diversified choices. FIG. 7 shows where the filter tank 8 and the coupling 9 are discarded, while the system is employed to circulate water flow and raise oxygen content merely, and the filter tank 8 may be combined for filtering the water flow, if desired (shown in FIG. 8). In another example, this invention may have the coupling 9 combinably disposed beneath the base 7 for a pumping duct to be combinably jointed (shown in FIG. 9), wherein the pumping duct is to be plugged in bottom layer of an aquarium so as to circulate the water flow in that layer. Furthermore, the coupling 9 may also be combinably jointed at a lower end of the filter tank 8 (shown in FIG. 3) to enable the circulated water flow in the bottom layer to be filtered by the filter sponge 81.

In summarizing the above described, improvement for individual component of a submersible motor has been made according to this invention, including: enhancing efficacy of mixing air and water for raising oxygen content; changing combining manner of the magnetic pivot and the blade for an easier assembling; improving coupling end of the cover for a for a tight connection with the water-guiding chamber; stepless adjusting measure for increasing flow volume; and functional selection for multiple combinations; to thus enhance applicability of a submersible motor designated for an aquarium.

What is claimed is:

1. An improvement made in components of submersible motor for aquarium, comprising:

a motor container;

a water-guiding chamber located at a bottom layer of said motor container;

a cover of said water-guiding chamber;

a magnetic pivot with its lower end plugged in said water-guiding chamber being driven to rotate;

a blade combinably jointed with said magnetic pivot at its upper end being located in said water-guiding chamber; and a base combinably jointed with a bottom end of said water-guiding chamber for water flow to flow through and enter said water-guiding chamber; wherein an air inlet and a water outlet are provided to said water-guiding chamber; a water inlet is disposed in said cover in an axial direction of the blade; said air inlet of said water-guiding chamber is disposed at a trail end edge of said blade; and a protruded ferrule is located at the upper end of said magnetic pivot for combinably jointing with a corresponding receptacle in said blade; and a partition piece is disposed at a position opposite to said air inlet and locating at a mouth portion of said tubular water outlet in inner side of said water-guiding chamber to facilitate and ensure a smooth channel for mixed water and air flow come from said blade to flow out of said tubular water outlet.

2. An improvement made in components of submersible motor for aquarium, comprising:

a motor container;

a water-guiding chamber located at a bottom layer of said motor container;

a cover of said water-guiding chamber;

a magnetic pivot with its lower end plugged in said water-guiding chamber being driven to rotate;

a blade combinably jointed with said magnetic pivot at its upper end being located in said water-guiding chamber; and a base combinably jointed with a bottom end of said water-guiding chamber for water flow to flow through and enter said water-guiding chamber; wherein an air inlet and a water outlet are provided to said water-guiding chamber; a water inlet is disposed in said cover in an axial direction of the blade; said air inlet of said water-guiding chamber is disposed at a trail end edge of said blade; and a protruded ferrule is located at the upper end of said magnetic pivot for combinably jointing with a corresponding receptacle in said blade.

3. The improvement made in components of submersible motor for aquarium of claim 1, wherein a movable control valve is disposed at a position between said cover and said base for opening and closing said water inlet, and an end edge of said control valve is snapped intimately to said motor container, so that said control valve can be stopped at an arbitrary position along its moving direction.

4. The improvement made in components of submersible motor for aquarium of claim 1 wherein a tongue piece is provided to said cover at its one end for inserting in said water-guiding chamber, and at the other end of said cover, a barb is formed to snap to the water-guiding chamber.

5. An improvement made in components of submersible motor for aquarium, comprising:

a motor container;

a water-guiding chamber located at a bottom layer of said motor container;

a cover of said water-guiding chamber;

a magnetic pivot pivotally disposed in said water-guiding chamber;

a blade combinably jointed with said magnetic pivot at its one end; and a water inlet located at center part of said cover of said water-guiding chamber; wherein an air intake manifold disposed on said cover of said water-guiding chamber at a position near the center point of said water inlet is extended from a lateral edge of said motor container to the air, so that air can be sucked into said water-guiding chamber for mixing and flowing together with water via said air intake manifold when the motor is pumping.

6. The improvement made in components of submersible motor for aquarium of claim 4, wherein said air intake manifold further comprises a front air duct fixedly disposed on said cover of said water-guiding chamber, and a rear air duct in connection with said front air duct being extended to reach an outer face of said motor container, and wherein a front end of said front air duct is located at a position near the center point of said water inlet.

* * * * *